United States Patent [19]

Calundann

[11] 4,337,190
[45] Jun. 29, 1982

[54] POLYESTER OF 6-HYDROXY-2-NAPHTHOIC ACID AND META-HYDROXY BENZOIC ACID CAPABLE OF READILY UNDERGOING MELT PROCESSING

[75] Inventor: Gordon W. Calundann, N. Plainfield, N.J.

[73] Assignee: Celanese Corporation, New York, N.Y.

[21] Appl. No.: 169,014

[22] Filed: Jul. 15, 1980

[51] Int. Cl.$^3$ .......................... C08K 5/13; C08G 63/18
[52] U.S. Cl. .................................... 524/599; 528/190; 528/193; 528/271
[58] Field of Search .................. 528/190, 193, 271 X; 260/40 R, 40 P, 33.4 R

[56] References Cited

U.S. PATENT DOCUMENTS 3,767,621 10/1973 Suzuki et al. ..................... 528/206
3,890,256 6/1975 McFarlane et al. ............... 525/444
4,130,545 12/1978 Calundann ........................ 528/190
4,161,470 7/1979 Calundann ........................ 528/206

FOREIGN PATENT DOCUMENTS 8855 of 0000 European Pat. Off. .
22344 of 0000 European Pat. Off. .

OTHER PUBLICATIONS

Gilkey et al., J. Appl. Polym. Sci., vol. II, No. 5, pp. 198-202.
Bier, Polymer, vol. 15, pp. 527-535.
Cottis, Modern Plastics, Jul. 1975, pp. 62-63.
Storm et al., Coating Plast. Preprint, vol. 34, No. 1, pp. 194-197.
Jackson et al., 30th Ann. Tech. Conf. 1975, Soc. Plastics Ind., Sec. 17-D, pp. 1-4.

Primary Examiner—H. S. Cockeram
Attorney, Agent, or Firm—Charles B. Barris

[57] ABSTRACT

A novel polyester is provided which has been found to exhibit an optically anisotropic melt phase at a temperature which enables it readily to undergo melt processing to form quality molded articles, etc. The polyester of the present invention is formed primarily of recurring 6-oxy-2-naphthoyl and m-oxybenzoyl moieties in the proportions indicated. The hydrogen atoms present upon the aromatic rings of these moieties optionally may be at least partially substituted (as described). Also, minor amounts of other ester-forming moieties may be included in the polyester so long as the optically anisotropic character in the melt and ease of melt processability are retained. In a preferred embodiment the wholly aromatic polyester is capable of undergoing melt processing at a temperature below approximately 370° C., and in a particularly preferred embodiment at a temperature of approximately 280° to 320° C.

35 Claims, No Drawings

POLYESTER OF 6-HYDROXY-2-NAPHTHOIC ACID AND META-HYDROXY BENZOIC ACID CAPABLE OF READILY UNDERGOING MELT PROCESSING

BACKGROUND OF THE INVENTION

Wholly aromatic polyester resins long have been known. For instance, 4-hydroxybenzoic acid homopolymer and copolymers have been provided in the past and were commercially available. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point. Molding techniques such as compression molding or sintering may be utilized with such materials; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids,* by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols),* by G. Bier, Polymer, Vol. 15, Pages 527 to 535 (August 1974), (c) *Aromatic Polyester Plastics,* by S. G. Cottis, Modern Plastics, Pages 62 to 63 (July 1975); and (d) *Poly(p-Oxybenzoyl Systems): Homopolymer for Coatings: Copolymers for Compression and Injection Molding,* by Roger S. Storm and Steven G. Cottis, Coating Plast. Preprint, Vol. 34, No. 1, Pages 194 to 197 (April 1974). See also, U.S. Pat. Nos. 3,039,994; 3,169,121; 3,321,437; 3,549,593; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotropy. See for instance, (a) *Polyester X7G-A Self Reinforced Thermoplastic,* by W. J. Jackson Jr., H. F. Kuhfuss, and T. F. Gray, Jr., 30th Anniversary Technical Conference, 1975 Reinforced Plastics/Composites Institute. The Society of the Plastics Industry, Inc. Section 17-D, Pages 1 to 4, (b) Belgian Pat. Nos. 838,935 and 828,936, (c) Dutch Pat. No. 7505551, (d) West German Nos. 2520819, 2520820, 2722120, 2834535, 2834536 and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,118,372; 4,130,545; 4,130,702; 4,153,779; 4,156,070; 4,159,365; 4,161,470; 4,169,933; 4,181,792; 4,183,895; 4,184,996; and 4,188,476; (g) U.K. application No. 2,002,404; and (h) European Patent application No. 0008855. See also commonly assigned U.S. Ser. Nos. 10,392 (now U.S. Pat. No. 4,238,599), and 10,393 (now U.S. Pat. No. 4,238,598), filed Feb. 8, 1979; 17,007 (now U.S. Pat. No. 4,230,817), filed Mar. 2, 1979; 21,050 (now U.S. Pat. No. 4,224,433), filed Mar. 16, 1979; 32,086 (now U.S. Pat. No. 4,219,461), filed Apr. 23, 1979; 54,049 (now U.S. Pat. No. 4,256,624), filed July 2, 1979; 91,003, filed Nov. 5, 1979; 109,573 (now U.S. Pat. No. 4,265,802), filed Jan. 4, 1980; 109,575 (now U.S. Pat. No. 4,285,852), filed Jan. 4, 1980; 128,759 (now U.S. Pat. No. 4,299,756), filed Mar. 10, 1980; and 128,778 (now U.S. Pat. No. 4,279,803), filed Mar. 10, 1980.

It is an object of the present invention to provide a wholly aromatic polyester which particularly is suited for the formation of molded articles, etc.

It is an object of the present invention to provide an improved melt processable wholly aromatic polyester capable of forming an optically anistropic melt phase at a temperature below approximately 400° C., preferably below 370° C., and most preferably below 350° C.

It is an object of the present invention to provide a wholly aromatic polyester which forms a highly tractable melt phase.

It is an object of the present invention to provide a wholly aromatic polyester which satisfactorily can be formed without precise regard to the stoichiometric proportions of reactants.

It is another object of the present invention to provide a novel wholly aromatic polyester which readily may be injection molded to form a molded article (which optionally may be fiber and/or filler reinforced).

It is another object of the present invention to provide a novel wholly aromatic polyester which may be melt extruded to form fibers and films.

These and other objects, as well as the scope, nature and utilization of the present invention will be apparent to those skilled in the art from the following detailed description.

SUMMARY OF THE INVENTION

It has been found that a melt processable wholly aromatic polyester capable of forming an optically anistropic melt phase at a temperature below approximately 400° C. consists essentially of the recurring moieties I and II which may include substitution of at least some of the hydrogen atoms present upon an aromatic ring wherein:

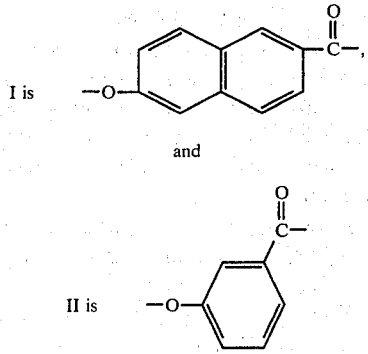

with said optional substitution if present being selected from the group consisting of an alkyl group of 1 to 4 carbon atoms, an alkoxy group of 1 to 4 carbon atoms, phenyl, halogen, and mixtures of the foregoing, and wherein said polyester comprises approximately 10 to 90 mole percent of moiety I, and approximately 10 to 90 mole percent of moiety II.

DESCRIPTION OF PREFERRED EMBODIMENTS

The wholly aromatic polyester of the present invention consists essentially of at least two recurring moieties which when combined in the polyester have been found to form an optically anisotropic melt phase at a temperature below approximately 400° C., preferably below 370° C., and most preferably below 350° C. In a preferred embodiment the wholly aromatic polyester is capable of undergoing melt processing at a temperature in the range of approximately 280° to 320° C. Because of its ability to exhibit optically anisotropic properties (i.e., liquid crystalline properties) in the melt, the polyester readily can form a product having a highly oriented molecular structure upon melt processing. The usual difficulties incurred when one attempts to melt process aromatic polyesters which do not exhibit melt anisotropy by conventional melt processing techniques effectively are eliminated. The aromatic polyester is considered to be "wholly" aromatic in the sense that each moiety present in the same contributes at least one aromatic ring to the polymer backbone.

Moiety I can be termed a 6-oxy-2-naphthoyl moiety and possesses the structural formula:

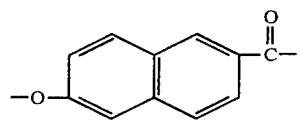

While not specifically illustrated in the structural formula, at least some of the hydrogen atoms present upon the aromatic rings of moiety I may be substituted. Such optional substitution may be an alkyl group of 1 to 4 carbon atoms, an alkoxy group of 1 to 4 carbon atoms, phenyl, halogen (e.g., Cl, Br, I), and mixtures of the foregoing. Representative ring substituted compounds from which moiety I can be derived include: 6-hydroxy-5-chloro-2-naphthoic acid, 6-hydroxy-5-methyl-2-naphthoic acid, 6-hydroxy-5-methoxy-2-naphthoic acid, 6-hydroxy-5-phenyl-2-naphthoic acid, 6-hydroxy-7-chloro-2-naphthoic acid, 6-hydroxy-5,7-dichloro-2-naphthoic acid, etc. The presence of ring substitution tends to modify to some degree the physical properties of the resulting polymer (e.g., the polymer may soften at a lower temperature, its impact strength may be improved, and the crystallinity of the solid polymer may be further decreased). In a preferred embodiment no ring substitution is present.

As will be apparent to those skilled in the art, moiety I can be derived from 6-hydroxy-2-naphthoic acid and the derivatives thereof. A convenient laboratory preparation for forming 6-hydroxy-2-naphthoic acid is described in Berichte, Vol. 58, 2835-45 (1925) by K. Fries and K. Schimmelschmidt which is herein incorporated by reference. Also, U.S. Pat. No. 1,593,816 is concerned with a process for synthesizing 6-hydroxy-2-naphthoic acid by reacting carbon dioxide with the potassium salt of beta-naphthol.

Moiety I comprises approximately 10 to 90 mole percent of the wholly aromatic polyester. In a preferred embodiment Moiety I is present in a concentration of approximately 50 to 80 mole percent, and most preferably in a concentration of approximately 60 to 70 mole percent, e.g. approximately 60 mole percent.

The second essential moiety (i.e. moiety II) can be termed a m-oxybenzoyl moiety and possesses the structural formula:

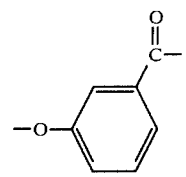

While not specifically illustrated in the structural formula, at least some of the hydrogen atoms present upon the aromatic ring of moiety II may be substituted. Such optional substitution may be an alkyl group of 1 to 4 carbon atoms, an alkoxy group of 1 to 4 carbon atoms, phenyl, halogen (e.g. Cl, Br, I), and mixtures of the foregoing. Representative examples of ring substituted compounds from which moiety II can be derived include 3-hydroxy-4-chlorobenzoic acid, 2-chloro-3-hydroxybenzoic acid, 3-hydroxy-5,6-dichlorobenzoic acid, 2,4-dichloro-3-hydroxybenzoic acid, 3-hydroxy-4-bromobenzoic acid, 3-hydroxy-4-methylbenzoic acid, 2,5-dimethyl-3-hydroxybenzoic acid, 2,6-dimethyl-3-hydroxybenzoic acid, 3-hydroxy-4-methoxybenzoic acid, 2,4-dimethoxy-3-hydroxybenzoic acid, 3-hydroxy-4-phenyl benzoic acid, etc. The presence of ring substitution in moiety II tends to modify to some degree the physical properties of the resulting polymer as previously described in connection with moiety I. In a preferred embodiment no ring substitution is present. For instance, moiety II is then derived from unsubstituted m-hydroxybenzoic acid or its derivatives.

Moiety II comprises approximately 10 to 90 mole percent of the wholly aromatic polyester. In a preferred embodiment moiety II is present in a concentration of approximately 20 to 50 mole percent, and most preferably in a concentration of approximately 30 to 40 mole percent, e.g., approximately 40 mole percent.

Other aryl ester-forming moieties (e.g. dicarboxy units, dioxy units and/or other combined oxy and carboxy units) other than moieties I and II additionally may be included in the wholly aromatic polyester of the present invention in a minor concentration (e.g. below approximately 10 mole percent) so long as such moieties do not adversely influence the desired optically anisotropic melt phase exhibited by the polyester heretofore defined and do not raise the melting point of the resulting polymer above that specified. For instance, moieties derived from terephthalic acid, hydroquinone, etc. may be included. As will be apparent to those skilled in the art, the total molar quantities of dicarboxy units and dioxy units present within the wholly aromatic polyester will be substantially equal. Additionally, a minor quantity of another moiety derived from an aromatic hydroxy acid such as the para-oxybenzoyl moiety which is derived from p-hydroxybenzoic acid optionally may be included in the wholly aromatic polyester together with moieties I and II.

In a preferred embodiment the wholly aromatic polyester is formed solely of moieties I and II. Accordingly, the reactants are inherently stoichiometrically balanced thereby greatly simplifying polymer formation since the importance of precise reactant measurement is minimized.

The wholly aromatic polyester of the present invention commonly exhibits

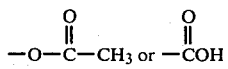

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

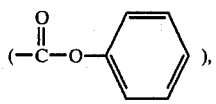

and methylester

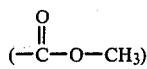

optionally may be included at the end of the polymer chains. The molecular weight of the polymer commonly can be increased by heating the solid polymer in an inert atmosphere. Also, the polymer can be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chlorophenol, and accordingly are not susceptible to solution processing. They can surprisingly be readily processed by common melt processing techniques as discussed hereafter. Most compositions are soluble in pentafluorophenol to at least some degree.

The wholly aromatic polyester of the present invention commonly exhibits a weight average molecular weight of about 2,000 to 200,000, and preferably about 10,000 to 50,000 e.g., about 20,000 to 25,000. Such molecular weight may be determined by standard techniques not involving the solutioning of the polymer, e.g., by end group determination via infrared spectroscopy on compression molded films. Alternatively, light scattering techniques in a pentafluorophenol solution may be employed in some instances to determine the molecular weight.

The wholly aromatic polyester prior to heat treatment additionally commonly exhibits an inherent viscosity (i.e., I.V.) of at least approximately 1.5, (e.g., approximately 1.5 to 10) when dissolved in a concentration of 0.1 percent by weight in pentafluorophenol at 60° C. In some embodiments the polymer is not sufficiently soluble in pentafluorophenol for such inherent viscosity determination.

Unlike the aromatic polyesters commonly encountered in the prior art, the wholly aromatic polyester of the present invention is not intractable and forms an optically anisotropic melt phase whereby order is manifest in the molten polymer. The subject polyester readily forms liquid crystals in the melt phase and accordingly exhibits a high tendency for the polymer chains to orient in the shear direction. Such optically anisotropic properties are manifest at a temperature which is amenable for melt processing to form shaped articles. Such anisotropy in the melt may be confirmed by conventional polarized light techniques whereby crossed-polaroids are utilized. More specifically, the optically anisotropic melt phase may conveniently be confirmed by the use of a Leitz polarizing microscope at a magnification of 40X with the sample on a Leitz hot stage and under a nitrogen atmosphere. The polymer melt transmits light when examined between crossed polarizers. The amount of light transmitted increases when the sample is sheared (i.e., is made to flow), however, the sample is optically anisotropic even in the static state.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly assigned U.S. Pat. No. 4,067,852 is described slurry polymerization process which may be employed to form the wholly aromatic polyester of the present invention wherein the solid product is suspended in a heat exchange medium. The disclosure of this patent is herein incorporated by reference.

When employing either the melt acidolysis procedure or the slurry procedure of U.S. Pat. No. 4,067,852 the organic monomer reactants from which the 6-oxy-2-naphthoyl moiety (i.e., moiety I) and the m-oxybenzoyl moiety (i.e., moiety II) are derived may be initially provided in a modified form whereby the usual hydroxyl groups of these monomers are esterified (i.e., they are provided as acyl esters). For instance, lower acyl esters of 6-hydroxy-2-naphthoic acid and m-hydroxybenzoic acid wherein the hydroxy groups are esterified may be provided as reactants. The lower acyl groups preferably have from about 2 to about 4 carbon atoms. Preferably the acetate esters of the organic compounds which form moieties I and II are provided. Accordingly, particularly preferred reactants for the condensation reaction are 6-acetoxy-2-naphthoic acid and m-acetoxybenzoic acid. If minor quantities of other aryl reactants (as previously discussed) optionally provide oxy-units within the resulting polymer, these too preferably are provided as the corresponding lower acyl esters.

Representative catalysts which optionally may be employed in either the melt hydrolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., BF$_3$), hydrogen halides (e.g., HCl), etc. The quantity of catalyst utilized typically is about 0.001 to 1 percent by weight based upon the total monomer weight, and most commonly about 0.01 to 0.2 percent by weight.

As previously indicated, the molecular weight of a previously formed wholly aromatic polyester may be further increased via a solid state polymerization procedure wherein the particulate polymer is heated in a flowing inert gaseous atmosphere (e.g. in a flowing nitrogen atmosphere at a temperature of about 260° C. for 10 to 12 hours).

The wholly aromatic polyester of the present invention readily can be melt processed to form a variety of shaped articles, e.g., molded three-dimensional articles, fibers, films, tapes, etc. The polyester of the present invention is particularly suited for molding applications and may be molded via standard injection molding techniques commonly utilized when forming molded articles. Unlike the wholly aromatic polyesters commonly encountered in the prior art it is not essential that more severe injection molding conditions (e.g., higher temperature), compression molding, impact molding, or plasma spraying techniques be utilized. Fibers or films may be melt extruded.

A molding compound may be formed from the wholly aromatic polyester of the present invention which incorporates approximately 1 to 60 percent by weight of a solid filler (e.g., talc) and/or reinforcing agent (e.g. glass fibers).

The wholly aromatic polyester also may be employed as a coating material which is applied as a powder or from a liquid dispersion.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instance, a standard conical spinneret containing 1 to 200 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed. The melt-spinnable wholly aromatic polyester is supplied to the extrusion orifice while molten at a temperature above its melting point.

Subsequent to extrusion through the shaped orifice the resulting filamentary material or film is passed in the direction of its length through a solidification or quench zone wherein the molten filamentary material or film is transformed to a solid filamentary material or film. The resulting fibers may have a denier per filament of about 1 to 50, and preferably a denier per filament of about 1 to 20.

The resulting filamentary material or film optionally may be subjected to a thermal treatment whereby its physical properties are further enhanced. The tenacity of the fiber or film generally is increased by such thermal treatment. More specifically, the fibers or films may be thermally treated in a flowing inert atmosphere (e.g., nitrogen, argon, helium) or in a non-inert flowing oxygen-containing atmosphere (e.g., air) with or without stress at a temperature below the polymer melting point until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour and at 270° C. for one hour. Alternatively, the fiber maybe heated at about 15° to 20° C. below the temperature at which it melts for about 48 hours. Optimum heat treatment conditions will vary with the specific composition of the wholly aromatic polyester and with the fiber's process history.

The following example is presented as specific illustration of the claimed invention. It should be understood, however, that the invention is not limited to the specific details set forth in the example.

EXAMPLE

To a three-neck, round bottom flask equipped with a stirrer, nitrogen inlet tube, and a heating tape wrapped distillation head connected to a condenser were added following:

(a) 358.8 grams 6-acetoxy-2-naphthoic acid (1.56 mole).

(b) 187.3 grams m-acetoxybenzoic acid (1.04 mole).

The charged flask was vacuum purged with dry nitrogen three times and brought to a temperature of 250° C. At 250° C., the clear, amber reaction melt was stirred rapidly under a slow stream of dry nitrogen while acetic acid was distilled from the polymerization vessel. The reaction melt turned opaque with suspended polymer after approximately 66 ml. of acetic acid were collected. The polymerization mixture was stirred for 1 hour and 18 minutes at 250° C., and then for approximately 28 minutes at 280° C. About 130 ml. of acetic acid were collected during these stages. The polymerization temperature was next increased to 330° C. for a few minutes and then to 340° C. The viscous polymer melt was stirred for about 20 minutes at 340° C. and then subjected to a reduced pressure stage. The contents of the polymerization vessel were next stirred for about 1 hour at a bath temperature of approximately 340° to 350° C. while under a pressure of 0.4 mm. of mercury. During this stage the polymer melt continued to increase in viscosity and was stirred more slowly while the remaining acetic acid was removed from the reaction vessel. Upon cooling to approximately 25° C. the polymer plug was ground in a mill and extracted with petroleum ether in a Soxhlet apparatus, and then dried.

The resulting wholly aromatic polyester had an inherent viscosity (I.V.) of 1.79 was determined in a pentafluorophenol solution of 0.1 percent by weight concentration at 60° C.

$$I.V. = (\ln \eta\ rel)/c$$

where c=concentration of solution (0.1 percent by weight), and $\eta$ rel=relative viscosity. The relative viscosity was measured by dividing the flow time in a capillary viscometer of the polymer solution by the flow time for the pure solvent.

When the polymer was subjected to differential scanning calorimetry (DSC), it exhibited what appear to be two glass transition temperatures (or solid-solid transitions) at approximately 115° C. and 155° C. No clearly defined crystalline melt transition was shown in the DSC scan. The polymer melt was optically anisotropic.

The resulting polymer was next subjected to a solid phase polymerization process. More specifically, the polymer was placed in a glass tube equipped with a nitrogen inlet at one end, and immersed in an oil bath while dry nitrogen was passed through the same, the bath temperature was slowly increased from 100° C. to 250° C. over a period of 6 hours and 40 minutes. The heating was continued for 17 hours at 250° C. under a stream of dry nitrogen after which the polymer was allowed to cool to approximately 25° C. while still under the stream of nitrogen. The polymer following the solid phase polymerization was not sufficiently soluble in pentafluorophenol to enable inherent viscosity determination.

Molded test bars were formed from the resulting polymer and were tested. More specifically, the molten polymer was injection molded using an 0.8 oz. Arburg injection molding machine with the rear, front and nozzle of the cylinder being provided at 308° C. A mold temperature of 70° C. was used. A total cycle time of 33 seconds was used which included 10 seconds for injection, 20 seconds for cooling, and 3 seconds for delay. The screw operated at 220 RPM and the injection pressure was 18,000 psi.

The resulting test bars which conformed to ASTM specifications were light yellow in color and possessed a smooth opalescent surface. The average physical properties of the resulting molded bars are set forth below:

Tensile Strength—15,200 psi
Tensile modulus—1,310,000 psi
Elongation—1.4 percent
Flexural strength—14,200 psi
Flexural modulus—1,120,000 psi The tensile properties were determined in accordance with standard test ASTM D638, Type V, and the flexural properties in accordance with ASTM D790.

Although the invention has been described with a preferred embodiment it is to be understood that variations and modifications may be employed without departing from the concept of the invention as defined in the following claims.

I claim:

1. A melt processable wholly aromatic polyester capable of forming an optically anisotropic melt phase at a temperature below approximately 400° C. consisting essentially of the recurring moieties I and II which may include substitution of at least some of the hydrogen atoms present upon an aromatic ring wherein:

I is 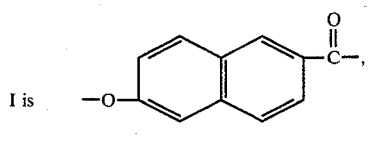

and

II is 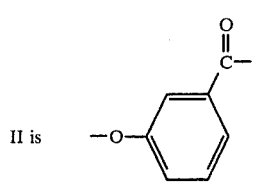

with said optional substitution if present being selected from the group consisting of an alkyl group of 1 to 4 carbon atoms, an alkoxy group of 1 to 4 carbon atoms, phenyl, halogen, and mixtures of the foregoing, and wherein said polyester comprises approximately 10 to 90 mole percent of moiety I, and approximately 10 to 90 mole percent of moiety II.

2. A melt processable wholly aromatic polyester according to claim 1 which is capable of forming an optically anisotropic melt phase at a temperature below approximately 350° C.

3. A melt processable wholly aromatic polyester according to claim 1 which is capable of forming an optically anisotropic melt phase at a temperature below approximately 320° C.

4. A melt processable wholly aromatic polyester according to claim 1 which is capable of undergoing melt processing at a temperature in the range of approximately 280° to 320° C.

5. A melt processable wholly aromatic polyester according to claim 1 which consists essentially of approximately 50 to 80 mole percent of moiety I and approximately 20 to 50 mole percent of moiety II.

6. A melt processable wholly aromatic polyester according to claim 1 which consists essentially of approximately 60 to 70 mole percent of moiety I and approximately 30 to 40 mole percent of moiety II.

7. A melt processable wholly aromatic polyester according to claim 1 wherein recurring moieties I and II are the sole moieties present.

8. A melt processable wholly aromatic polyester according to claim 1 wherein recurring moieties I and II are free of ring substitution.

9. A melt processable wholly aromatic polyester according to claim 1 which exhibits an inherent viscosity of at least 1.5 when dissolved in a concentration of 0.1 percent by weight in pentafluorophenol at 60° C.

10. A melt processable wholly aromatic polyester according to claim 1 which exhibits an inherent viscosity of 1.5 to 10 when dissolved in a concentration of 0.1 percent by weight in pentafluorophenol at 60° C.

11. A molded article comprising the melt processable wholly aromatic polyester of claim 1.

12. A molding compound comprising the melt processable wholly aromatic polyester of claim 1 which incorporates approximately 1 to 60 percent by weight of a solid filler and/or reinforcing agent.

13. A fiber which has been melt spun from the wholly aromatic polyester of claim 1.

14. A film which has been melt extruded from the wholly aromatic polyester of claim 1.

15. A melt processable wholly aromatic polyester capable of forming an optically anisotropic melt phase at a temperature below approximately 370° C. consisting essentially of the recurring moieties I and II which may include substitution of at least some of the hydrogen atoms present upon an aromatic ring wherein:

I is 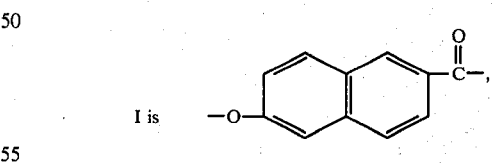

and

II is 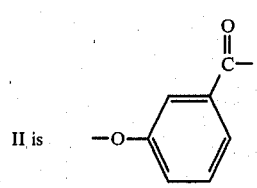

with said optional substitution if present being selected from the group consisting of an alkyl group of 1 to 4 carbon atoms, an alkoxy group of 1 to 4 carbon atoms, phenyl, halogen, and mixtures of the foregoing, and wherein said polyester comprises approximately 50 to 80 mole percent of moiety I, and approximately 20 to 50 mole percent of moiety II.

16. A melt processable wholly aromatic polyester according to claim 15 which is capable of forming an optically anisotropic melt phase at a temperature below approximately 350° C.

17. A melt processable wholly aromatic polyester according to claim 15 which is capable of undergoing melt processing at a temperature in the range of approximately 280° to 320° C.

18. A melt processable wholly aromatic polyester according to claim 15 which consists essentially of approximately 60 to 70 mole percent of moiety I and approximately 30 to 40 mole percent of moiety II.

19. A melt processable wholly aromatic polyester according to claim 15 wherein recurring moieties I and II are the sole moieties present.

20. A melt processable wholly aromatic polyester according to claim 15 wherein recurring moieties I and II are free of ring substitution.

21. A melt processable wholly aromatic polyester according to claim 15 which exhibits an inherent viscosity of at least 1.5 when dissolved in a concentration of 0.1 percent by weight in pentafluorophenol at 60° C.

22. A melt processable wholly aromatic polyester according to claim 15 which exhibits an inherent viscosity of approximately 1.5 to 10 when dissolved in a concentration of 0.1 percent by weight in pentafluorophenol at 60° C.

23. A molded article comprising the melt processable wholly aromatic polyester of claim 15.

24. A molding compound comprising the melt processable wholly aromatic polyester of claim 15 which incorporates approximately 1 to 60 percent by weight of a solid filler and/or reinforcing agent.

25. A fiber which has been melt spun from the wholly aromatic polyester of claim 15.

26. A film which has been melt extruded from the wholly aromatic polyester of claim 15.

27. A melt processable wholly aromatic polyester capable of forming an optically anisotropic melt phase at a temperature below approximately 350° C. consisting of the recurring moieties I and II which are free of ring substitution wherein:

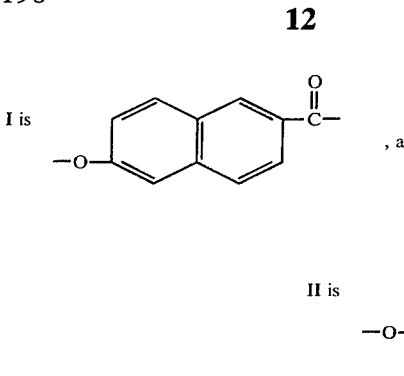

and wherein said polyester comprises approximately 60 to 70 mole percent of moiety I, and approximately 30 to 40 mole percent of moiety II.

28. A melt processable wholly aromatic polyester according to claim 27 which is capable of forming an optically anisotropic melt phase at a temperature below approximately 320° C.

29. A melt processable wholly aromatic polyester according to claim 27 which consists of approximately 60 mole percent of moiety I and approximately 40 mole percent of moiety II.

30. A melt processable wholly aromatic polyester according to claim 27 which exhibits an inherent viscosity of at least 1.5 when dissolved in a concentration of 0.1 percent by weight in pentafluorophenol at 60° C.

31. A melt processable wholly aromatic polyester according to claim 27 which exhibits an inherent viscosity of approximately 1.5 to 10 when dissolved in a concentration of 0.1 percent by weight in pentafluorophenol at 60° C.

32. A molded article comprising the melt processable wholly aromatic polyester of claim 27.

33. A molding compound comprising the melt processable wholly aromatic polyester of claim 27 which incorporates approximately 1 to 60 percent by weight of a solid filler and/or reinforcing agent.

34. A fiber which has been melt spun from the wholly aromatic polyester of claim 27.

35. A film which has been melt extruded from the wholly aromatic polyester of claim 27.

* * * * *